United States Patent [19]
Langendorf et al.

[11] Patent Number: 5,640,519
[45] Date of Patent: Jun. 17, 1997

[54] METHOD AND APPARATUS TO IMPROVE LATENCY EXPERIENCED BY AN AGENT UNDER A ROUND ROBIN ARBITRATION SCHEME

[75] Inventors: Brian K. Langendorf, El Dorado Hills; James M. Dodd, Citrus Heights; George R. Hayek, Cameron Park, all of Calif.

[73] Assignee: Intel Corporation, Santa Clara, Calif.

[21] Appl. No.: 528,914

[22] Filed: Sep. 15, 1995

[51] Int. Cl.$^6$ .................. G06F 13/364; G06F 13/362; G06F 13/36
[52] U.S. Cl. .................. 395/291; 395/293; 395/729
[58] Field of Search .................. 395/287, 288, 395/289, 290, 291, 293, 294, 296, 728, 729

[56] References Cited

U.S. PATENT DOCUMENTS

| | | |
|---|---|---|
| 5,119,292 | 6/1992 | Baker et al. .................. 395/725 |
| 5,303,382 | 4/1994 | Buch et al. .................. 395/725 |
| 5,519,837 | 5/1996 | Tran .................. 395/291 |

*Primary Examiner*—Jack B. Harvey
*Assistant Examiner*—Jigar Pancholi
*Attorney, Agent, or Firm*—Blakely, Sokoloff, Taylor & Zafman

[57] ABSTRACT

An arbitration circuit which controls arbitration for a resource by a first plurality of agents including a latency sensitive agent. The arbitration circuit comprises a mapping circuit and an arbiter. The mapping circuit is coupled to the first plurality of agents in order to receive a resource request signal from the latency sensitive agent and thereafter produce a plurality of request signals identical to the resource request signal. These request signals are input into at least a first and second I/O ports of the arbiter. The arbiter, which is coupled to the mapping circuit, including a second plurality of I/O ports and a second plurality of control ports each corresponding to one of the I/O ports. The arbiter is configured to arbitrate request signals input into the second plurality of I/O ports including the plurality of request signals, to monitor which I/O port was last activated, and to deactivate a control port associated with the I/O port thereby producing a control signal. This control signal signals the mapping circuit to disable at least one of the plurality of request signals upon detecting that the control signal is associated with the first I/O port or the second I/O port.

24 Claims, 6 Drawing Sheets

METHOD AND APPARATUS TO IMPROVE LATENCY EXPERIENCED BY AN AGENT UNDER A ROUND ROBIN ARBITRATION SCHEME

BACKGROUND OF THE INVENTION

1. Field of the Invention

The present invention relates to the field of data transfer. More particularly, the present invention relates to improving latency of one or more agents operating in accordance with a round robin arbitration scheme.

2. Description of Art Related to the Invention

For many years, electronic systems (e.g., networks, computer systems, printers, etc.) have been designed to allow multiple agents exclusive access to a single resource such as an interconnect bus, memory and the like. These agents, normally hardware devices, issue resource requests to gain exclusive access to the resource for at most a predetermined period of time. Typically, an arbitration circuit is required to arbitrate access to the resource between multiple "requesting agents" (i.e., agents simultaneously requesting access to the resource). After one of the requesting agents gains access to the resource, it performs a particular operation and relinquishes access to the resource upon completion of the particular operation or expiration of the predetermined time period, whichever occurs first.

At the moment, there exists a number of well-known arbitration schemes used by arbitration circuits. One arbitration scheme is called "fixed priority arbitration" which grants access of the resource to a requesting agent having the highest priority. Thus, this highest priority agent is guaranteed to experience very low latency. However, the fixed priority arbitration scheme "starves" requesting agents assigned with a low priority when an agent assigned with the highest priority is frequently requesting access to the resource.

Another arbitration scheme is called "round robin arbitration" which is slightly more complex to implement than fixed priority arbitration. However, it offers the advantage of uniform resource allocation. As a result, the latency imposed on the requesting agents is generally uniform since each requesting agent is provided access to the resource before another agent regains access to the resource. Generally, this type of arbitration is preferred except when at least one of the agents, referred to as a "latency sensitive agent", must comply with strict latency constraints. In that case, the use of round robin arbitration would expose the electronic system to performance degradation and perhaps catastrophic data loss if the delay caused by the other agents in the electronic system accessing the resource exceeds the latency constraints imposed on the latency sensitive agent.

Hence, it would be desirable to implement an arbitration circuit operating in accordance with a round robin arbitration scheme which is specifically configured to minimize latency experienced by one or more agents which are subject to strict latency requirements.

BRIEF SUMMARY OF THE INVENTION

The present invention relates to an apparatus and method for minimizing latency experienced by at least one latency sensitive agent contending with other agents for access to a resource. The apparatus comprises a mapping circuit and an arbiter operating in accordance with a round robin arbitration scheme.

The mapping circuit is coupled to the latency sensitive agent and the other agents which are collectively referred to as a first plurality of agents. The mapping circuit at least receives a resource request signal from the latency sensitive agent and in response, produces a plurality of request signals identical to the resource request signal. These request signals are input into at least a first and second input/output ("I/O") port of the arbiter. In addition, the mapping circuit routes grants signal, corresponding to the request signals, from the arbiter to the latency sensitive agent.

The arbiter, which is coupled to the mapping circuit, includes a second plurality of I/O ports. Furthermore, the arbiter includes a second plurality of control ports each corresponding to one of the I/O ports. The arbiter is configured to arbitrate request signals input into its I/O ports including the plurality of request signals based on the resource request signals from the latency sensitive agent. In addition, the arbiter monitors which I/O port of the second plurality of I/O ports was last activated and deactivates a control port associated with the last activated I/O port in order to produce a control signal.

In the event that the last activated I/O port is either the first or second I/O port, the mapping circuit disables at least one of the plurality of request signals to facilitate fair allocation of the resource.

BRIEF DESCRIPTION OF THE DRAWINGS

The features and advantages of the present invention will become apparent from the following detailed description of the present invention in which.

DETAILED DESCRIPTION OF THE INVENTION

An apparatus and method are described to minimize latency experienced by one or more agents of the electronic system contending for access to a common resource. In the following detailed description, numerous specific details are set forth such as a specific configuration of the arbitration circuit. It should be borne in mind that the present invention need not be limited for use with one latency sensitive agent requiring only one shadow agent but is applicable to any number of latency sensitive agents each requiring one or more shadow agents. To better illustrate the operations of the present invention, a specific example has been created for this sole purpose and should not be construed in any way as a limitation on the scope of the present invention.

Some terminology is used herein to discuss certain elements of the present invention. For example, the term "asserted" indicates that the signal is logically "high" (i.e., logic "1") unless denoted as an active-low signal. In addition, the term "latency sensitive agent" pertains to an agent employed in the electronic system which normally could not be supported by a round robin arbitration scheme due to strict latency constraints because these latency constraints would not be complied with if the all agents of the electronic system simultaneously requested access to a resource. A "shadow agent" represents a virtual agent which emulates the operations of the latency sensitive agent but is viewed as a different agent by the arbiter. Moreover, a "logic gate" is defined as a one or more conventional gates (e.g., AND gate, OR gate, XOR gate, etc.) which are configured to perform a given operation. These gates may be made using well-known CMOS fabrication technology or any other semiconductor fabrication technology.

Figure 1:
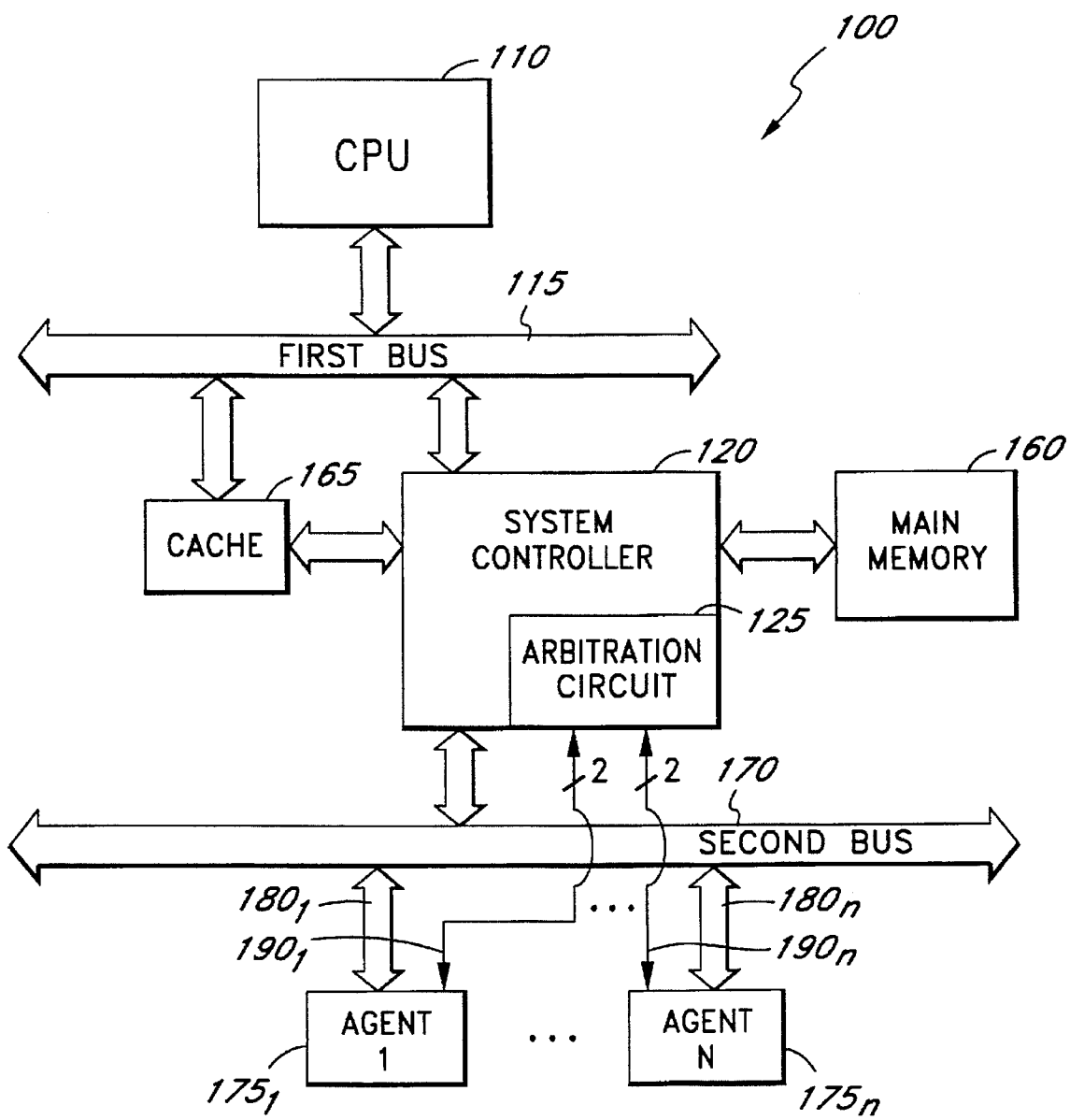
FIG. 1 is a simplified block diagram of a computer system including an arbitration circuit, implemented within a system controller, which arbitrates resource requests from multiple agents and minimizes latency of at least one of the agents having strict latency constraints.

Referring now to FIG. 1, a simplified embodiment of a computer system 100 implementing the present invention is shown. The computer system 100 comprises a central processing unit ("CPU") 110 and a system controller 120, both of which are coupled to a first bus 115. The system controller 120 is further coupled to (i) a main memory element 160 to store information used by the central processing unit 110, (ii) an external cache 165 to provide information storage with faster access time than main memory 160, and (iii) a second bus 170 such as a Peripheral Component Interconnect ("PCI") bus. A plurality of "n" agents $175_1$–$175_n$ (where "n" is an arbitrary whole number) are coupled to the second bus 170 through interconnects buses $180_1$–$180_n$ including address, data and control lines. Moreover, as shown, these agents $175_1$–$175_n$ are able to gain control of a resource (e.g., the second bus 170) by issuing a resource request to and receiving a grant from an arbitration circuit 125 implemented within the system controller 120 via dedicated control lines $190_1$–$190_n$. It is contemplated that the control lines $190_1$–$190_n$ could have been routed to the arbitration circuit 125 via the interconnect buses $180_1$–$180_n$ and the second bus 170 instead of dedicated control lines.

Figure 2:
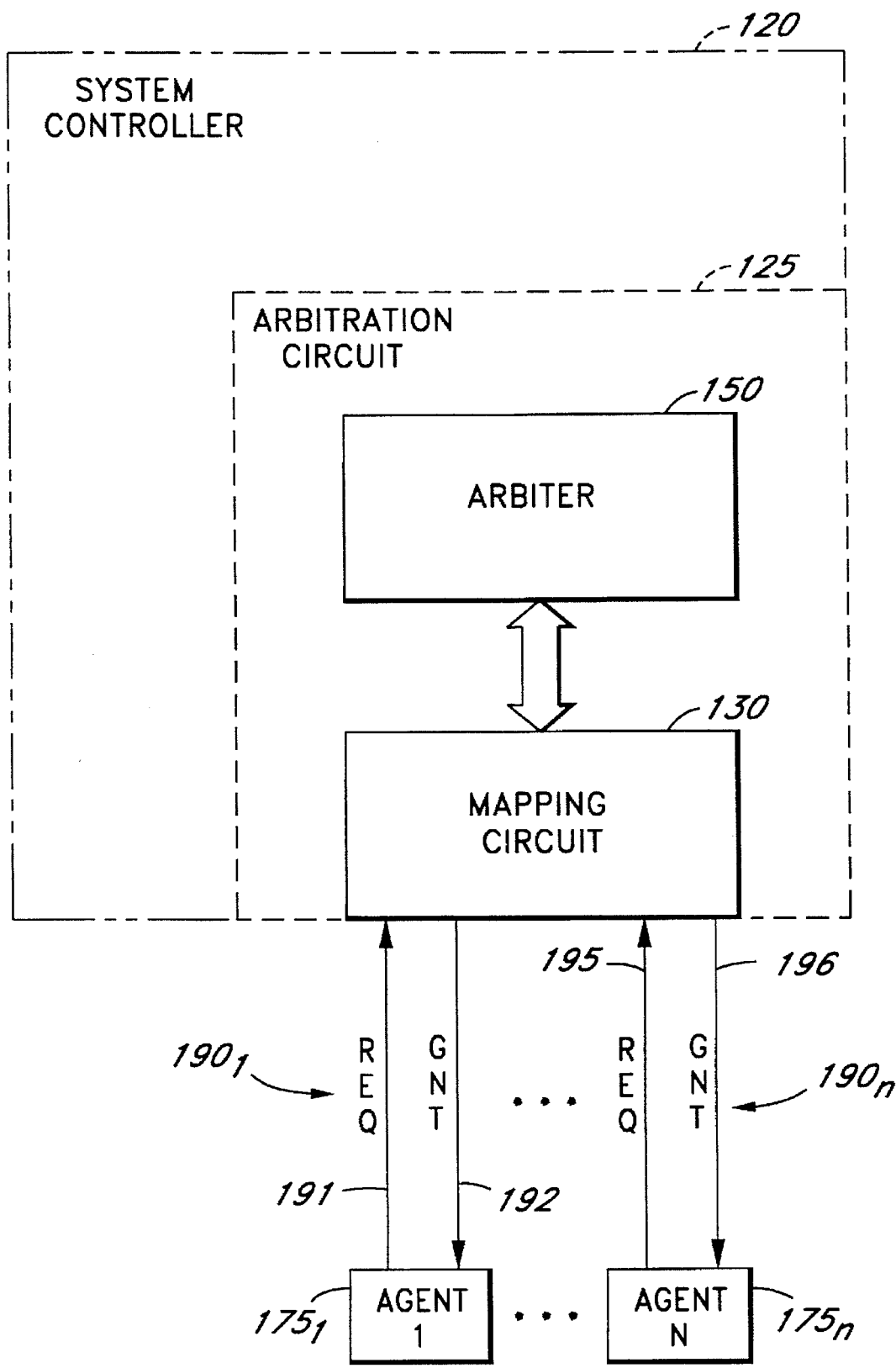
FIG. 2 is a block diagram of the arbitration circuit including an arbiter and a mapping circuit coupled to each of the plurality of agents via a pair of unidirectional communication lines in order to route request and grant signals to and from the arbiter.

Referring now to FIG. 2, the arbitration circuit 125 of FIG. 1 is shown. The arbitration circuit 125 including a mapping circuit 130 and an arbiter 150. The arbiter 150 indirectly communicates with the plurality of agents through unidirectional request and grant lines. As shown, a first agent $175_1$ and a $n^{th}$ agent $175_n$ request access to a resource by asserting a first request line 191 and a $n^{th}$ request line 195. These resource requests are transmitted into the mapping circuit 130 which routes a number of requests, identical to the resource request, to the arbiter 150 according to a selected routing scheme. Upon receiving the requests, the arbiter 150 arbitrates all requests received according to its round robin arbitration scheme and then causes the mapping circuit 130 to issue a grant to the agent awarded access to the resource by asserting its grant line. For example, the arbiter 150 causes the mapping circuit 130 to assert a first grant line 192 upon awarding access to the first agent $175_1$, to assert a $n^{th}$ grant line 196 upon awarding access to the $n^{th}$ agent $175_n$ and the like. However, the mapping circuit 130 precludes the agent granted access to the resource from regaining access to the resource for the next access period unless there are no other agents requesting access to the resource.

Figure 3:
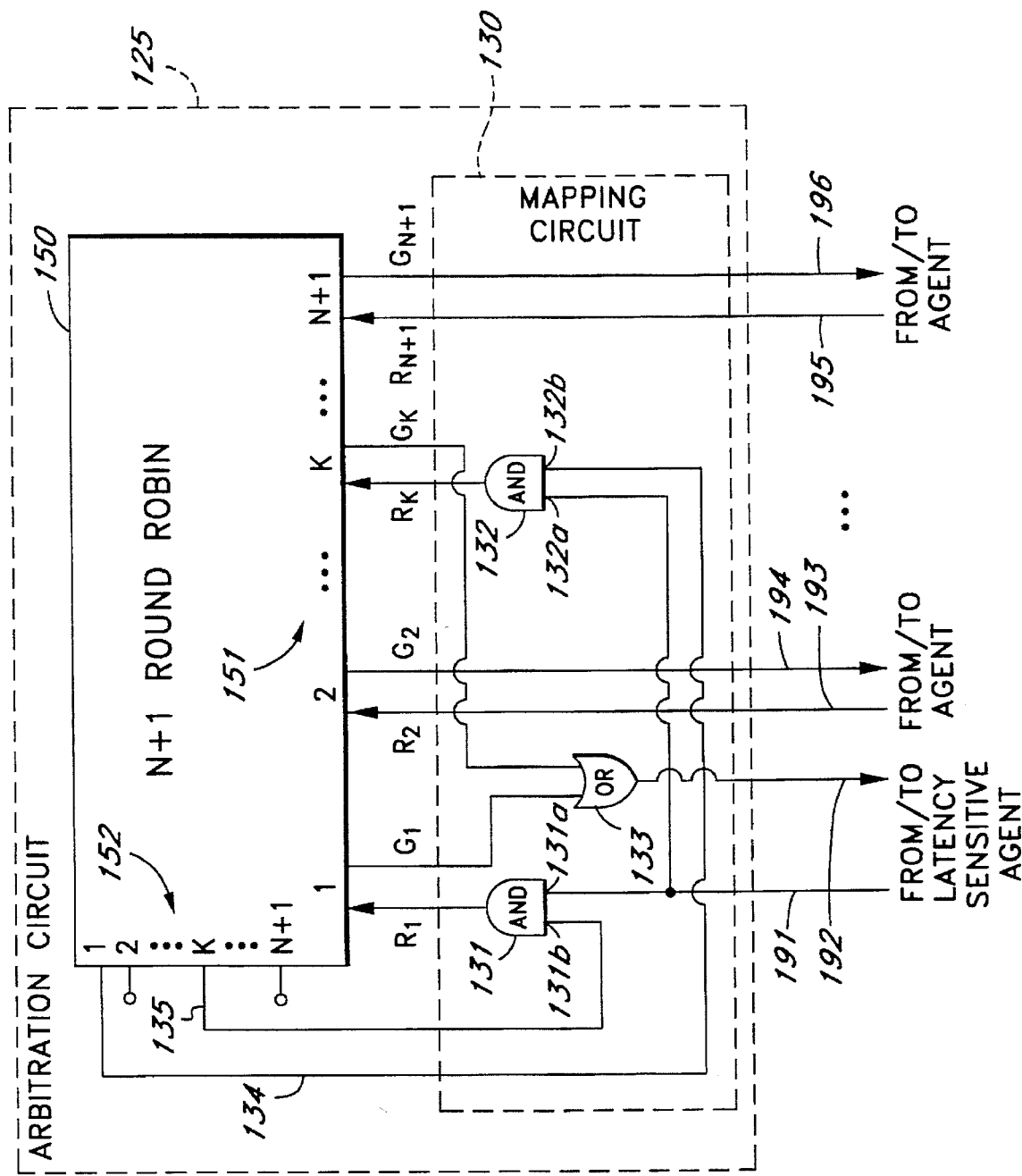
FIG. 3 is a block diagram featuring one embodiment of the mapping circuit and round robin arbiter working in combination to reduce latency of one latency sensitive agent.

Referring now to FIG. 3, the arbitration circuit 125 featuring an embodiment of the mapping circuit which supports one latency sensitive agent and a total "n" requesting agents is illustrated. The arbitration circuit 125 includes a round robin arbiter 150 including "n+1" input/output ("I/O") ports 151 consecutively numbered from "1" to "n+1". This type of round robin arbiter 150 is generally referred to as a "n+1 round robin arbiter" Although not shown, it is well-known that the I/O ports 151 include an input port into which a request signal is transmitted originating from a requesting agent to request arbitration between at most "n+1" agents (including any shadow agents) and a distinct output port from which a grant signal is transmitted indicating that the requesting agent has been awarded access to the resource. In this embodiment, a first I/O port (labeled "1") is reserved for the latency sensitive agent while the $k^{th}$ I/O port is reserved for its shadow agent.

Since the round robin arbiter 150 monitors which I/O ports were previously activated, and thus indirectly monitors which agents were last granted access to the resource, it is capable of providing such information to the mapping circuit 130. This information is important in preserving fair allocation of the resource which is a primary goal of round robin arbitration. In order to indirectly monitor which agent was the last agent granted access to the resource, the round robin arbiter 150 is configured to include a plurality of control ports 152, each corresponding to a unique I/O port, of which one of the control ports outputs a deasserted, logic "low" signal. This signal indicates that its corresponding I/O port was previously activated and that the agent, associated with that I/O port, was the last agent given access to the resource.

Referring still to FIG. 3, the latency sensitive agent is coupled to the mapping circuit 130 via (i) a request line 191 allowing the latency sensitive agent to request ownership of a resource whose access is controlled by the round robin arbiter 150 and (ii) a grant line 192 to receive a grant signal indicating that the latency sensitive agent has been granted access of the resource. As shown, other agents, which are not latency sensitive agents, are coupled directly to the round robin arbiter 150 via its corresponding request and grant lines.

For example, in FIG. 3, both the first and $k^{th}$ I/O ports (labeled "1" and "k") of the "n+1" round robin arbiter 150 are coupled to the latency sensitive agent. Therefore, the $k^{th}$ agent through the $n^{th}$ agent would be shifted by one I/O port so that the $k+1^{th}$ I/O port of the round robin arbiter 150 would be coupled to the $k^{th}$ agent and so on until the $n^{th}$ agent, which is not a latency sensitive agent, would be directly coupled to the round robin arbiter 150 through request and grant lines 195 and 196 associated with the $n+1^{th}$ I/O port, respectively.

In this embodiment, the mapping circuit 130 includes three logic gates 131–133 necessary to support one latency sensitive agent assigned to the first I/O port of the round robin arbiter 150 and its sole shadow agent assigned to the $k^{th}$ I/O port. The request line 191 from the latency sensitive agent is coupled to a first input 131a of a first logic gate 131 (e.g., a two-input AND gate) and a first input 132a of a second logic gate 132 (e.g., a two-input AND gate). The second logic gate 132 is coupled to a $k^{th}$ I/O port of the round robin arbiter 150. Preferably, although not required, "k" is equal to "n/2" (if "n" is an even integer) or "(n+1)/2" (if "n" is an odd integer) so that the latency experienced by the latency sensitive agent can be substantially reduced by as much as fifty percent.

When the latency sensitive agent requests access to the resource, it asserts the request line 191. As a result, the first logic gate 131 outputs an asserted request signal ("$R_1$") to the round robin arbiter 150 requesting access to the resource, provided its second input 131b is asserted. Concurrently, the second logic gate 132 outputs an asserted request signal ("$R_k$") to the round robin arbiter 150 if its second input 132b is asserted. If the latency sensitive agent was not the last agent to receive access to the resource and its I/O port has the highest priority among those ports associated with agents requesting access to the resource, the round robin arbiter 150 grants access to the latency sensitive agent.

After the latency sensitive agent are relinquished control of the resource, it cannot immediately reclaim access to the resource if there is another agent requesting access to the resource. Rather, it would have to wait until the next access period to gain access to the resource thereby generally supporting fair allocation of the resource in accordance with the objectives of round robin arbitration. This is accomplished by connecting the control port associated with the latency sensitive agent (i.e., I/O port "1") to the second input 132b of the second logic gate 132 via control line 134 as well as the control port associated with the shadow agent (i.e., I/O port "k") to the second input 131b of the first logic gate 131 via control line 135.

Therefore, if the round robin arbiter 150 previously granted access of the resource to the latency sensitive agent via the $k^{th}$ I/O port (e.g., the $k^{th}$ I/O port was the last port activated by the round robin arbiter 150), the request ("$R_1$") signal to the first I/O port is deasserted. As a result, the $k^{th}$ I/O port is assigned the lowest priority for a subsequent access request. Likewise, if the first I/O port was the last port activated by the round robin arbiter 150, the request signal to the $k^{th}$ I/O port is deasserted. In this case, the first I/O port is now assigned the lowest priority.

In light of the fact that the resource request from the latency sensitive agent is mapped (i.e., routed) into two I/O ports of the arbiter, there now exists two possible grants which can result. Thus, the third logic gate 133 (e.g., a two-input OR gate) is coupled to receive as input grant signals ("$G_1$" and "$G_k$") from the first I/O port and the $k^{th}$ I/O port, respectively. Thus, the latency sensitive agent receives all grant signals associated therewith.

The operation of the present invention may best be understood by providing a specific example showing multiple latency sensitive agents having different latency constraints. As previously mentioned herein, this specific example lends itself to explaining the operation of the present invention and in no way should be construed as a limitation on the scope of the invention.

Figure 4A:
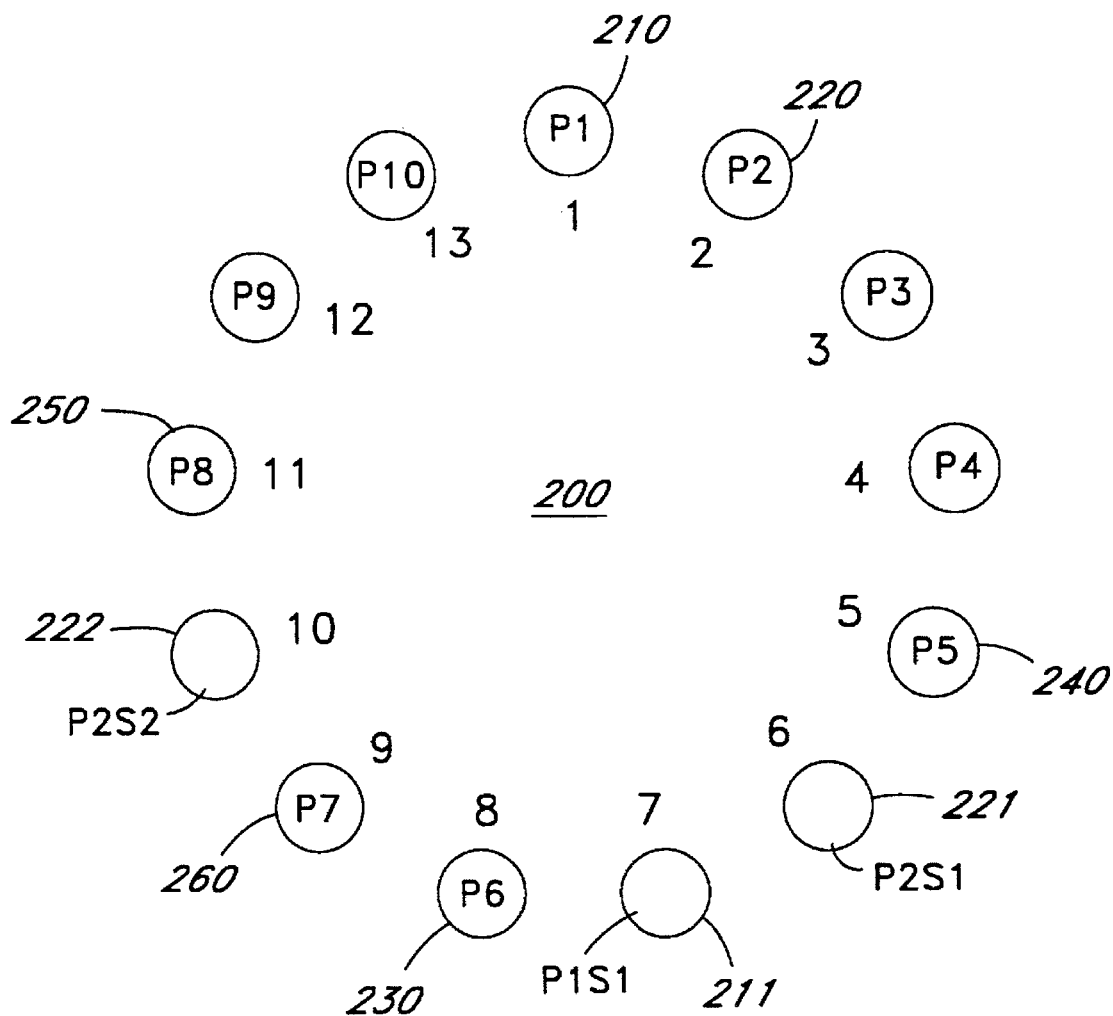
FIG. 4a is an illustrative example of an arbitration ring where the mapping circuit and a round robin arbiter are supporting ten requesting agents of which two are latency sensitive agents requiring a total of three shadow agents.

As shown in FIG. 4a, an arbitration ring 200 of the round robin arbiter of FIG. 2 is shown where, as typically illustrated, priority of the ports is represented by placement on the arbitration ring 200. Proceeding in a clockwise fashion, if port "P5" was the last activated port, the priority scheme would proceed as P2S1, P1S1, P6, P7, etc.

In the current example, there exists ten (10) agents in which two of these agents are latency sensitive agents, namely a first latency sensitive agent and a second latency sensitive agent. As shown, the maximum latency that the first latency sensitive agent can tolerate is exceeded if more than one-half of the agents in the system are given access to the resource before the first latency sensitive agent can regain access to the resource. Therefore, the first latency sensitive agent is configured to be coupled to two ports of the arbiter represented in the arbitration ring 200 as ports P1 210 and P1S1 211.

The P1S1 port, which is utilized by a shadow agent of the first latency sensitive agent, is prioritized by its insertion into the arbitration ring 200 before a port "P6" 230, coupled to a sixth agent, and before port "P5" 240, coupled to a fifth agent. This chosen assertion is diametrically opposite the placement of P1 210 on the arbitration ring 200 because the latency sensitive agent can not tolerate latency greater than that imposed by one-half of the agents.

Furthermore, it is contemplated that the second latency sensitive agent has more stringent latency constraints that the first latency sensitive agent thereby requiring three ports, represented by "P2" 220, "P2S1" 221 and "P2S2" 222 of which two ports ("P2S1" and "P2S2") are associated with its "shadow" agents. The ports associated with the shadow agents are generally equivalently spaced from the second latency sensitive agent along the arbitration ring 200 according to the following equation:

$$\text{spacing} = \text{INT}\left(\frac{n + \sum_{i=1}^{L} m_i}{m_i}\right), \qquad \text{Eqn.}$$

where

"INT(x)" represents integer value of "x",

"n"=total number of agents, and

"$m_i$"=the number of shadow agents required for a given latency sensitive agent; and "L"=the number of latency sensitive agents.

Therefore, P2S1 221 is inserted into the ring before P1S1 211 and after P5 240 while a second shadow agent 222 is inserted in the ring before a port associated with the eight agent "P8" 250 and after a port associated with the seventh agent P7" 260.

Figure 4B:
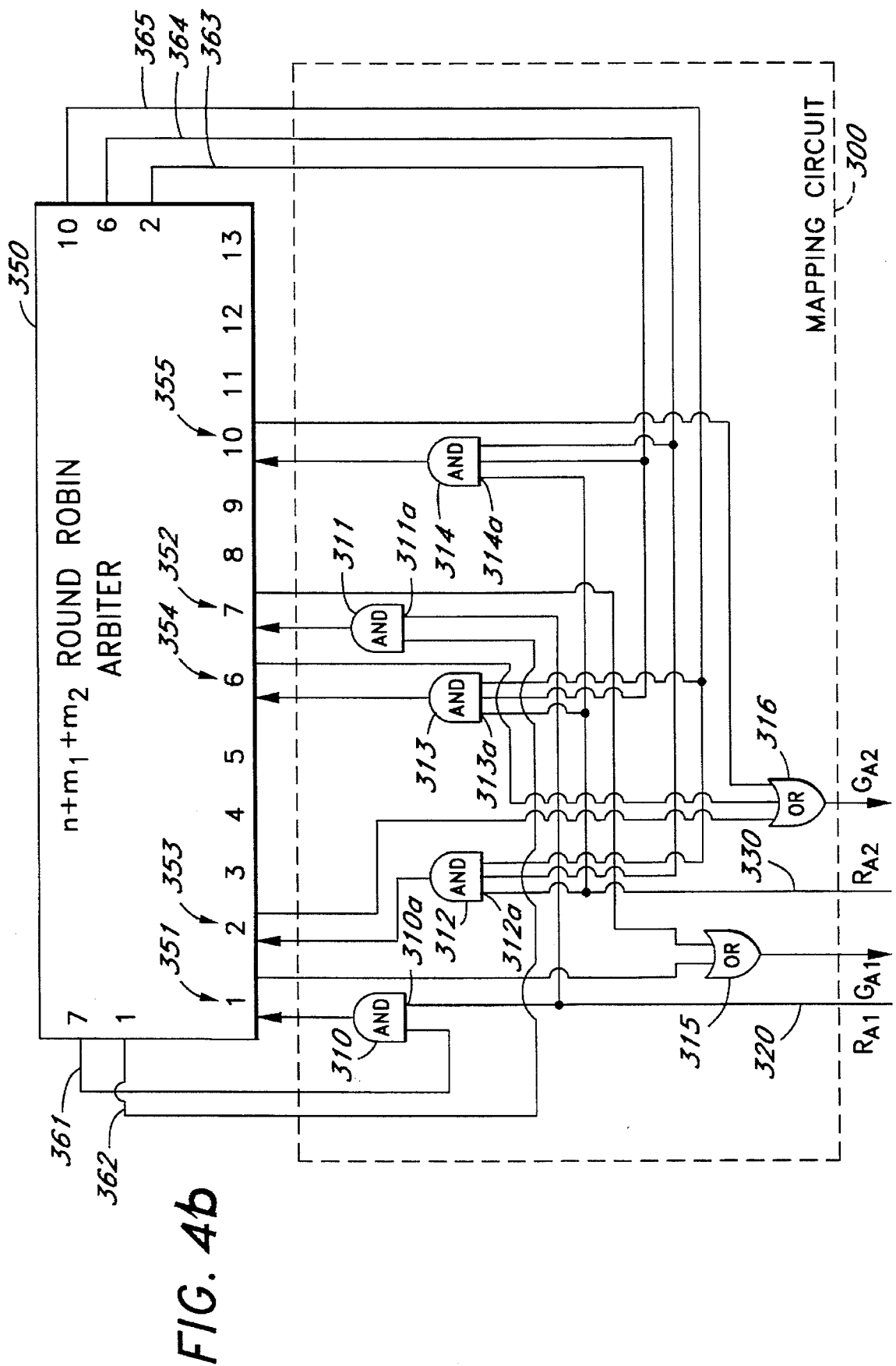
FIG. 4b is a block diagram of the mapping circuit and round robin arbiter configured in accordance to the arbitration ring of FIG. 4a where the two latency sensitive agents coupled to a first and second input ports of the round robin arbiter.

Referring now to FIG. 4b, a block diagram of the mapping circuit 300 and a "$n+m_1+m_2$" (13 input) round robin arbiter 350 is shown which supports two latency sensitive agents requiring one ("$m_1$") and two ("$m_2$") shadow agents, in accordance, with the arbitration ring scheme of FIG. 4a. The first latency sensitive agent is coupled to a first and seventh I/O ports 351–352 of the round robin arbiter 350 while the second latency sensitive agent is coupled to a second, sixth and tenth I/O ports 353–355. The mapping circuit 300 includes seven logic gates 310–316. A first and second logic gates 310 and 311 operate as two-input AND gates while a third, fourth and fifth logic gates 312–314 operate as three-input AND gates. A sixth and seventh logic gates 315 and 316 operate as a two-input and three-input OR gates, respectively.

A request line ("$R_{A1}$") 320 for the first latency sensitive agent is coupled to a first input 310a of the first logic gate 310 and a first input 311a of the second logic gate 311 which operates as the shadow agent of the first latency sensitive agent. Moreover, a request line ("$R_{A2}$") 330 for the second latency sensitive agent is coupled to first input 312a of the third logic gate 312 as well as the first inputs 313a and 314a of the fourth and fifth logic gates 313 and 314, respectively, which operate as shadow agents ("P2S1" and "P2S2") for the second latency sensitive agent.

As a result, when the first latency sensitive agent requests access to the resource by asserting the request line 320, a request signal is transmitted into the first I/O port 351 of the round robin arbiter via the first logic gate 310, provided the last access to the resource was not made by a shadow agent of the first latency sensitive agent obtained through the seventh I/O port 352. This condition is signified by the de-assertion of a control line 361 which disables the first logic gate 310 from asserting a request to the first I/O port 351 of the round robin arbiter. The same operations pertains to issuing a request to the seventh input 352 only if a control line 362 are asserted indicating that the last access was not granted to the first latency sensitive agent nor its shadow agent.

Similarly, when the second latency sensitive agent requests access to the resource by asserting the request line 330, a request is transmitted into the second I/O port 353 via the third logic gate 312, provided the last access to the resource was not made by (i) a first shadow agent coupled to the sixth I/O port 354 or (ii) a second shadow agent coupled to the tenth I/O port 355. If the last access to the resource was made by the second latency sensitive agent, its corresponding control line 363 would be deasserted. This would, in effect, disables the fourth and fifth logic gates 313 and 314. Additionally, if the last access to the resource was made by the first or second shadow agent, the third and fifth or third and fourth logic gates 312, 314 or 312–313 would be disabled. Collectively, these logic gates are collectively used to indicate whether the last access was not granted to the second latency sensitive agent nor its shadow agents.

Since the requests from the first and second latency sensitive agents are mapped into two I/O ports and three I/O ports of the arbiter 350, respectively, there now exists a total of five possible grants which can result. Thus, the sixth logic gate 315 (e.g., a two-input OR gate) is coupled to receive as input grant signals from the first and seventh I/O ports 351–352 to produce a first grant ("$G_{A1}$") signal to the first latency sensitive agent. Moreover, the seventh logic gate 316 (e.g., a three-input OR gate) is coupled to receive as input grant signals from the second, sixth and tenth I/O ports 353–355 to produce a second grant ("$G_{A2}$") signal to the second latency sensitive agent. As shown, the latency sensitive agents receives all grant signals associated therewith.

Figure 5:
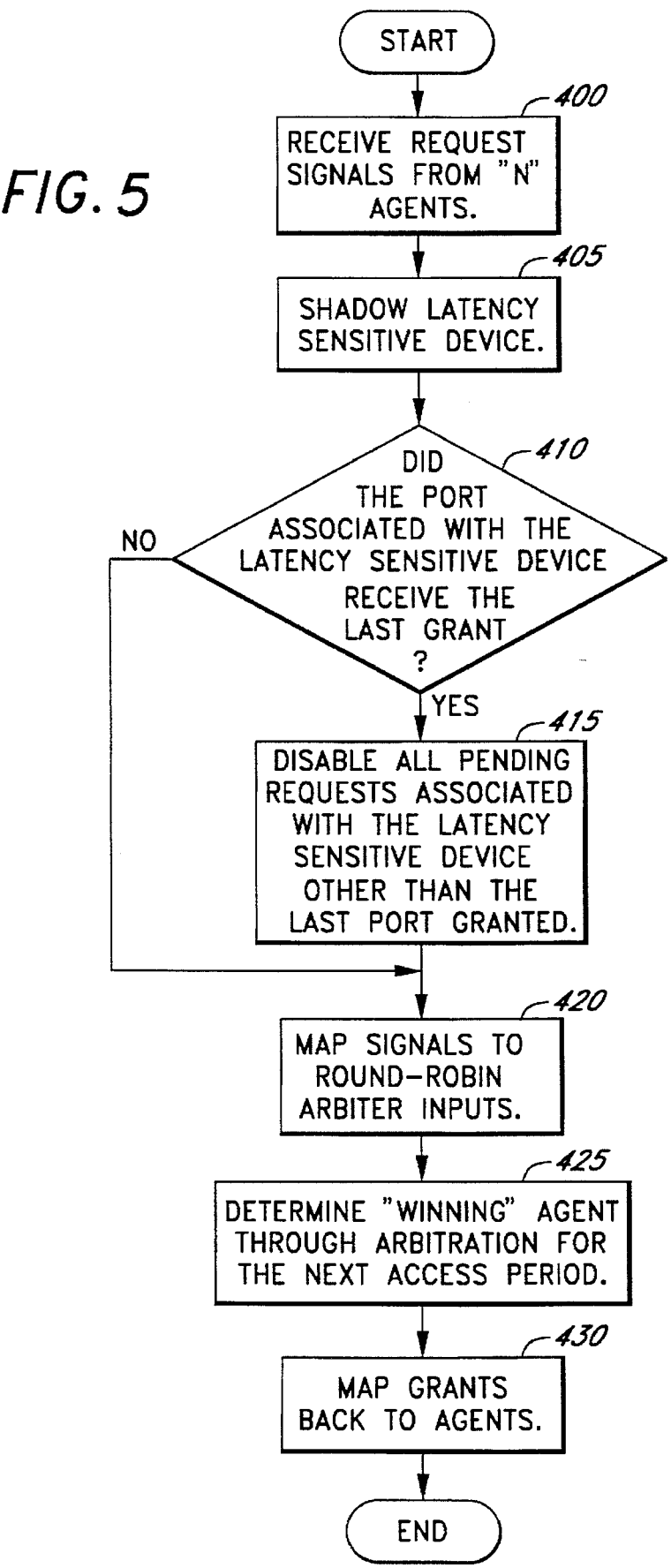
FIG. 5 is a flowchart illustrating the general operation of the mapping circuit and round robin arbiter of FIG. 3.

Referring to FIG. 5, a flowchart illustrating the general operation of the mapping circuit and round robin arbiter of FIG. 3 is shown since the hardware functionality can be emulated through software. In Step 400, a mapping source receives resource requests for access of the resource from up to "n" agents. Next, the mapping source produces a requisite number of shadow agents for one or more latency sensitive agents to allow such agents to operate in a round robin arbitration scheme (Step 405). Then, a determination is made by the mapping source as to whether a port associated with the latency sensitive agent was granted the last (i.e., most recent) access to the resource (Step 410). If so, the mapping source disables any pending requests associated with the latency sensitive agent except the request to the port last granted (Step 415). If not, the process continues to Step 420.

In Step 420, the mapping source routes the requests for access to the resource to the round robin arbiter. The round robin arbiter performs arbitration on the requests and determines which agent is to receive access to the resource through a grant signal (Step 425). Thereafter, the mapping source appropriately maps the grant signal the agent given access to the resource (Step 430).

The present invention described herein may be designed in many different methods and using many different configurations. While the present invention has been described in terms of various embodiments, other embodiments may come to mind to those skilled in the art without departing from the spirit and scope of the present invention. The invention should, therefore, be measured in terms of the claims which follow.

What is claimed is:

1. An arbitration circuit for controlling arbitration by a plurality of agents, including a latency sensitive agent, requesting access to a resource by transmitting a resource request signal, the arbitration circuit comprising:

an arbiter including a plurality of I/O ports having at least two I/O ports dedicated to the latency sensitive agent, and a plurality of control ports each corresponding to one of said plurality of I/O ports, said arbiter being able to (i) determine an I/O port of said plurality of I/O ports that was last activated in order to request access to the resource, and (ii) deactivate a control signal from a control port associated with said I/O port; and a mapping circuit coupled to said arbiter and the plurality of agents, said mapping circuit receives the resource request signal from the latency sensitive agent, and in response, produces a plurality of request signals output to said at least two I/O ports, the plurality of request signals being used to activate both of said at least two I/O ports when none of said at least two I/O ports was last activated.

2. The arbitration circuit according to claim 1, wherein said arbiter operates in accordance with a round robin arbitration scheme.

3. The arbitration circuit according to claim 2, wherein said mapping circuit further routes a plurality of grant signals, corresponding to said plurality of request signals, from said arbiter to the latency sensitive agent.

4. The arbitration circuit according to claim 1, wherein said mapping circuit includes a first logic gate that produces a request signal to be input into a first I/O port of said at least two I/O ports when said first logic gate receives as input at least said resource request signal from the latency sensitive agent and an active control signal from a control port associated with a second I/O port of said at least two I/O ports;

a second logic gate that produces a request signal to be input into said second I/O port when said second logic gate receives as input at least said request signal from said latency sensitive agent and an active control signal from a control port associated with said first I/O port; and a third logic gate that outputs a grant signal to the latency sensitive agent, said third logic gate receives as input a grant signal corresponding to said first I/O port and a grant signal corresponding to said second I/O port.

5. The arbitration circuit according to claim 4, wherein each of said first and second logic gates operates as a logical AND gate.

6. The arbitration circuit according to claim 5, wherein said third logic gate operates as a logical OR gate.

7. The arbitration circuit according to claim 1, wherein said at least two I/O ports include at least a first I/O port and a second I/O port.

8. The arbitration circuit according to claim 1, wherein separation of the first I/O port from said second I/O port in accordance with a round robin scheme is calculated by taking an integer value of a result of a sum of the first plurality of agents and the at least two I/O ports, the result divided by the at least two I/O ports.

9. An arbitration circuit for controlling arbitration of a plurality of agents, including a latency sensitive agent, requesting access to a resource by transmitting a resource request signal, the arbitration circuit comprising:

arbiter means for performing round-robin arbitration operations, for determining which I/O port of a plurality of I/O ports was last activated in order to request access to the resource, and for deactivating a control port associated with said I/O port, said arbiter means including the plurality of I/O ports having at least a first and second I/O ports dedicated to the latency sensitive agent, and a plurality of control ports corresponding to each of the plurality of I/O ports; and mapping means for receiving at least a resource request signal from the latency sensitive agent and for producing a plurality of request signals based on the resource request signal to be output to said first and second I/O ports, the plurality of request signals being used to activate said at least first and second I/O ports of an arbiter means when none of said first and second I/O ports was last activated.

10. The arbitration circuit according to claim 9, wherein said arbiter means operates in accordance with a round robin arbitration scheme.

11. The arbitration circuit according to claim 10, wherein said mapping means further routes a plurality of grant signals, corresponding to said plurality of request signals, from said arbiter means to the latency sensitive agent.

12. The arbitration circuit according to claim 9, wherein said mapping means includes first logic means for outputting a request signal to said first I/O port when said first logic means receives as input at least said resource request signal from the latency sensitive agent and an active control signal from a control port associated with said second I/O port;

second logic means for outputting a request signal to said second I/O port when said second logic means receives as input at least said request signal from said latency sensitive agent and an active control signal from a control port associated with said first I/O port; and third logic means for outputting a grant signal to the latency sensitive agent, said third logic means receives as input a grant signal corresponding to said first I/O port and a grant signal corresponding to said second I/O port.

13. The arbitration circuit according to claim 12, wherein each of said first and second logic means operates as a logical AND gate.

14. The arbitration circuit according to claim 13, wherein said third logic means operates as a logical OR gate.

15. A computer system comprising:

a bus configured to transfer data within the computer system;

a plurality of agents coupled to said bus, each of said plurality of agents arbitrates for access to said bus by asserting a resource request signal, said plurality of agents includes a latency sensitive agent; and an arbitration circuit to control arbitration by said plurality of agents for access to said bus, said arbitration circuit, coupled to said plurality of agents, includes an arbiter including a plurality of I/O ports having at least two I/O ports dedicated to the latency sensitive agent, and a plurality of control ports each corresponding to one of said plurality of I/O ports, said arbiter being able to (i) determine an I/O port of said plurality of I/O ports that was last activated in order to request access to said bus and (ii) deactivate a control signal from a control port associated with said I/O port, and a mapping circuit coupled to said arbiter and the plurality of agents, said mapping circuit receives the resource request signal from said latency sensitive agent, and in response, produces a plurality of request signals based on the resource request signal to be output to said at least two I/O ports, the plurality of request signals being used to activate both of said at least two I/O ports when none of the at least two I/O ports was last activated.

16. The computer system according to claim 15, wherein said arbiter of said arbitration circuit operates in accordance with a round robin arbitration scheme.

17. The computer system according to claim 15, wherein said mapping circuit of said arbitration circuit includes a first logic gate that produces a request signal to be input into a first I/O port of said at least two I/O ports when said first logic gate receives as input at least said resource request signal from said latency sensitive agent and an active control signal from a control port associated with a second I/O port of said at least two I/O ports;

a second logic gate that produces a request signal to be input into said second I/O port of said at least I/O ports when said second logic gate receives as input at least said resource request signal from said latency sensitive agent and an active control signal from a control port associated with said first I/O port; and a third logic gate that outputs a grant signal to said latency sensitive agent, said third logic gate receives as input a bus grant signal corresponding to said first I/O port and a grant signal corresponding to said second I/O port.

18. The computer system according to claim 17, wherein each of said first and second logic gates operates as a logical AND gate.

19. The computer system according to claim 18, wherein said third logic gate operates as a logical OR gate.

20. A computer system comprising:

bus means for transferring data within the computer system;

agent means for asserting a resource request signal to arbitrate for access to said bus means, said agent means being coupled to said bus means and being a plurality of agents including a latency sensitive agent; and arbitration means for controlling arbitration of said bus means by said agent means requesting access to said bus means by transmitting at least one resource request signal, said arbitration means being coupled to said agent means and to said bus means and including arbiter means for performing round-robin arbitration operations, for determining which I/O port of a plurality of I/O ports was last activated in order to request access to the bus means, and for deactivating a control port associated with said I/O port, said arbiter means including the plurality of I/O ports having at least a first and second I/O ports dedicated to the latency sensitive agent, and a plurality of control ports each corresponding to one of the plurality of I/O ports, and mapping means for receiving at least a resource request signal from the latency sensitive agent and for producing a plurality of request signals based on said resource request signal to be output to said first and second I/O ports, the plurality of request signals being used to activate said at least first and second I/O ports of an arbiter means when none of said first and second I/O ports was last activated.

21. The computer system according to claim 20, wherein said arbiter means operates in accordance with a round robin arbitration scheme.

22. The computer system according to claim 21, wherein said mapping means routes a plurality of grant signals, corresponding to said plurality of request signals, from said at least two I/O ports of said arbiter means to said latency sensitive agent.

23. The computer system according to claim 20, wherein said mapping means includes

- first logic means for outputting a request signal to said first I/O port when said first logic means receives as input at least said resource request signal from said latency sensitive agent and an active control signal from a control port associated with said second I/O port;
- second logic means for outputting a request signal to said second I/O port when said second logic means receives as input at least said request signal from said latency sensitive agent and an active control signal from a control port associated with said first I/O port; and
- third logic means for outputting a grant signal to said latency sensitive agent, said third logic means receives as input a grant signal corresponding to said first I/O port and a grant signal corresponding to said second I/O port.

24. A method for minimizing latency experienced by a latency sensitive device of a first plurality of agents contending for access to a resource, the method comprising the steps of:

receiving a resource request signal from the latency sensitive device;

duplicating the resource request signal to produce a plurality of request signals directed to separate inputs of an arbiter;

determining whether the latency sensitive device received access to the resource for a last access period, wherein
- if true, disabling at least one of said plurality of request signals;

mapping said plurality of requests to the arbiter operating in accordance to a round-robin arbitration scheme;

determining which of the first plurality of agents is awarded access to the resource; and mapping at least a plurality of grant signals corresponding to said plurality of requests issued by the latency sensitive agent.

* * * * *